United States Patent

Gowanlock

[11] 3,731,356
[45] May 8, 1973

[54] CUTTING TOOL
[75] Inventor: Thomas W. Gowanlock, Rochester, Mich.
[73] Assignee: General Electric Company, New York, N.Y.
[22] Filed: June 18, 1971
[21] Appl. No.: 154,551

[52] U.S. Cl. ................................................29/96 R
[51] Int. Cl. ...............................................B26d 1/00
[58] Field of Search...........................................29/96

[56] References Cited

UNITED STATES PATENTS

| | | | |
|---|---|---|---|
| 3,084,416 | 4/1963 | Broughton | 29/96 |
| 2,999,301 | 9/1961 | Conti et al. | 29/96 |
| 3,102,326 | 9/1963 | Conti et al. | 29/96 |

Primary Examiner—Harrison L. Hinson
Attorney—Frank L. Neuhauser, Oscar B. Waddell, Joseph B. Forman and Allard A. Braddock

[57] ABSTRACT

A cutting tool of the type having a recess or pocket at one axial end thereof in which a disposable cemented carbide cutting insert is held by an overhead clamp which also acts to pull the insert back into the pocket. A separate chip breaker plate is releasably attached to the clamp. The means for attachment of the chip breaker plate to the clamp extends through the chip breaker to the clamp and contains a projection below the chip breaker plate which fits within the hole in the insert, so that tightening of the clamp pulls the insert simultaneously toward the shoulder and the base of the recess to firmly clamp the insert in the recess of the shank.

2 Claims, 3 Drawing Figures

PATENTED MAY 8 1973 3,731,356
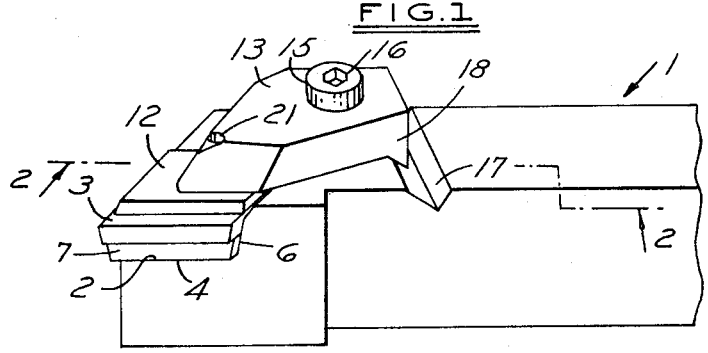
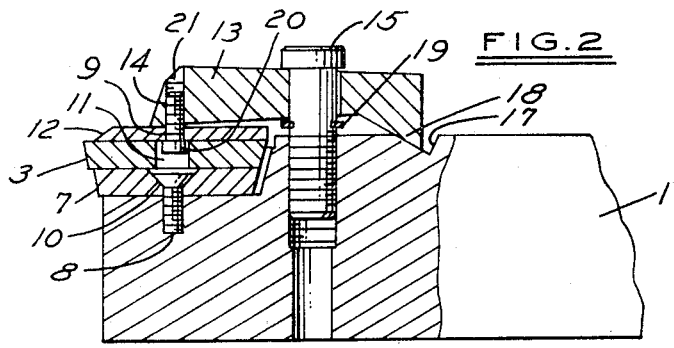
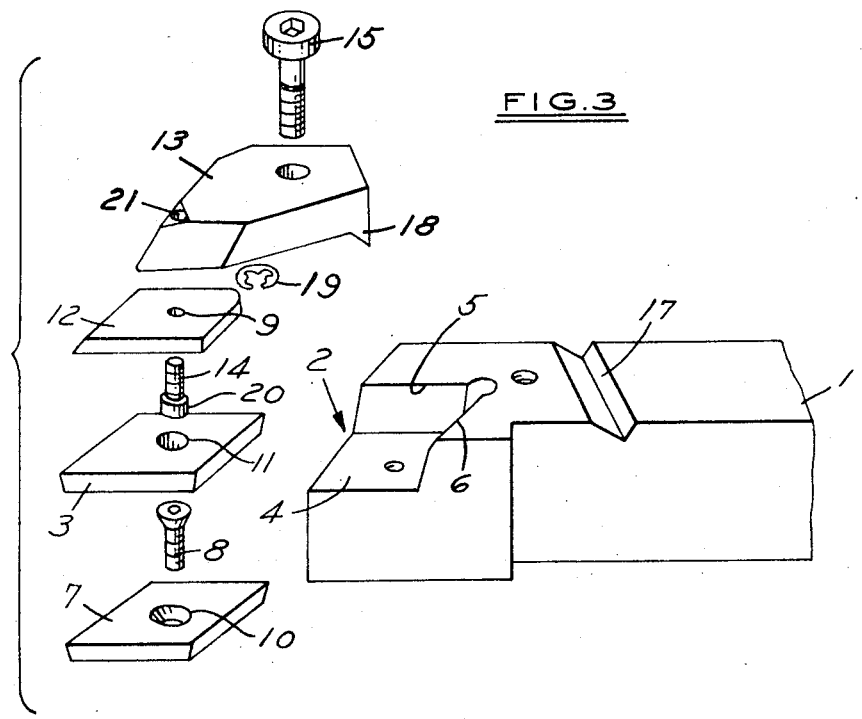
INVENTOR.
THOMAS W. GOWANLOCK
BY
Harold J. Holt
ATTORNEY

CUTTING TOOL

This invention relates to a cutting tool of the type used in the machining of metal. More specifically, this invention relates to a cutting tool of the type having an overhead clamp for the retention of a disposable cutting insert, usually of the cemented carbide type.

U.S. Pat. No. 3,084,416 discloses a cutting tool in which an overhead clamp retains a disposable cutting insert and a separate chip breaker in a recess at an axial end of the shank. It is particularly concerned with precise and secure positioning and retention of inserts having included angles as small as 55°. One of the drawbacks of the toolholder construction there disclosed and of similar toolholder designs is that upon release of the clamp for indexing or changing of the insert, both the chip breaker plate and the insert are loosened. It is desirable, during the machining operation, that the changing or indexing of an insert be accomplished as efficiently and expeditiously as possible. Toward this end, it would be desirable to accomplish the twofold purpose of precisely positioning and retaining a disposable insert, particularly of the so-called tracer type having a relatively small included angle, while at the same time providing means by which only the insert itself is loosened when it is intended to be indexed or replaced.

It is therefore an object of the present invention to provide a toolholder of the foregoing type which precisely positions and retains a cutting insert and in which the clamp may be loosened for purposes of changing or indexing the insert without disengaging or unattaching any of the other components of the toolholder.

The above and other objects of the invention are achieved in the present invention by a modification of the design of the attachment means for the chip breaker plate such that it performs the dual function of holding the chip breaker plate as well as acting to pull the insert back horizontally against the pocket of the toolholder.

The invention will be better understood from the following description taken in connection with the accompanying drawing in which FIG. 1 is a perspective view of the toolholder of the invention;

FIG. 2 is a cross-sectional view taken along the lines 2—2 of FIG. 1 of the head portion of the tool; and FIG. 3 is a pictorial view of the toolholder of FIGS. 1 and 2, with the parts in disassembled relationship.

As can be seen from the drawing, the toolholder comprises a shank 1 having a recess 2 at one axial end thereof for the reception of a cutting insert 3. The recess contains a base surface 4 along a horizontal plane and two angularly related shoulder surfaces 5 and 6 along a substantially vertical plane. Within the recess 2 is mounted a cutting insert seat 7 on the base surface 4. The cutting insert seat is held in place on the base of the recess by means of screw 8 which fits within a tapered hole 10 centrally located in the seat and is threaded into the base 4 of the recess. Immediately above the seat 7 in the recess of the holder is the cutting insert 3, also containing a centrally disposed vertical hole 11. Insert 3 is of the disposable positive-rake type containing cutting edges at the meeting of its top and peripheral surfaces. Immediately above the cutting insert is a chip breaker plate 12 releasably attached to a clamp 13 by means of a threaded screw 14 fitting loosely within an unthreaded hole 9 in the chip breaker and a threaded hole 21 in the clamp. The clamp is of the overhead or bridge type and is releasably attached to the shank 1 of the holder by means of bolt 15 of the socket head, cap-screw type. The head of bolt 15 contains a hexagonal opening 16 for the reception of a hexagonal wrench for tightening or loosening the clamp. Bolt 15 contains a snap ring 19 so that rotation of the bolt raises and lowers the clamp from the shank. A transverse groove 17 of "V" cross-sectional shape is located on an upper surface of shank 1 axially rearward of the recess. The rear portion of the clamp has a complementary shaped V-shaped projection 18 adapted to fit within the V-shaped groove in the shank, and more particularly along the axially forward leg of the groove. Upon tightening the clamp to lock the insert in position, the axially forward portion of the V-shaped projection on the clamp abuts with the axially forward portion of the V-shaped groove in the shank, so that the clamp moves not only downwardly into locking position, but also rearwardly along the axis of the shank.

Screw 14, for releasable attachment of chip breaker plate 12 to the forward underside of clamp 13, has a downwardly projecting head 20 which also may contain a hexagonally shaped hole at its bottom portion for the insertion of a wrench for loosening or tightening of the screw. The head portion 20 of screw 14 projects downwardly into hole 11 of disposable insert 3 when it is in locked position. The diameter of head portion 20 of the screw should be slightly smaller than the diameter of the hole 11 in the insert and slightly larger than the diameter of the hole 9 in the chip breaker. When the clamp 13 is tightened into locking position, the head 20 of screw 14 pulls the insert back against the shoulders 5 and 6 of the recess as the clamp is tightened into position. Thus, tightening of the clamp serves to pull the insert against the shoulders of the recess at the same time that it locks the insert down against the base of the recess. When the clamp is loosened in order either to index or replace the cutting insert, only the cutting insert itself will be released. All of the remaining parts, including the seat, the clamp, the chip breaker and their associated fastening means, remain attached to the shank.

I claim:

1. In a cutting tool comprising a shank having a recess at one axial end thereof for the reception of a cutting insert, said recess having a base surface along a horizontal plane and at least two angularly related shoulder surfaces along a vertical plane, a disposable cutting insert mounted in the recess of the shank and supported against the angularly related shoulders of the recess, the insert having a centrally disposed vertical hole therethrough, and an overhead clamp mounted on the shank for releasably holding the cutting insert, a separate chip breaker plate overlying the upper parallel surface of the insert and means for releasable attachment of the chip breaker plate to the clamp, means for tightening the clamp while at the same time forcing it axially rearward as it is tightened, the improvement in which the means for releasable attachment of the chip breaker plate to the clamp is a threaded screw extending through an unthreaded hole in the chip breaker to a threaded hole in the clamp, the head of the screw projecting below the chip breaker plate and fitting within the hole in the insert so that tightening of the clamp simultaneously pulls the insert toward the shoulders and the base of the recess to clamp the insert firmly in the recess of the shank.

2. The cutting tool of claim 1 in which the diameter of the head of the threaded screw is slightly larger than the diameter of the hole in the chip breaker.

* * * * *